United States Patent [19]
Morizot et al.

[11] Patent Number: 5,622,643
[45] Date of Patent: Apr. 22, 1997

[54] PROCESS AND DEVICE FOR CONTROLLING POWER FOR A CIRCUIT FOR INDUCTION COOKING INCLUDING A RESONANT INVERTOR

[75] Inventors: Gérard Morizot, Villingen; Gérard Rilly, Unterkirnach; Sean Carthy, Villingen, all of Germany

[73] Assignee: Compagnie Europeenne pour l'Equipment Menager Cepem, St Jean de la Ruelle, France

[21] Appl. No.: 197,303

[22] Filed: Feb. 16, 1994

[30] Foreign Application Priority Data

Feb. 16, 1993 [FR] France ................. 93 01711

[51] Int. Cl.$^6$ ........................................ H05B 6/08
[52] U.S. Cl. .................... 219/625; 219/626; 219/665; 99/325
[58] Field of Search .................... 219/625, 626, 219/627, 665, 666, 667; 99/325, DIG. 14

[56] References Cited

U.S. PATENT DOCUMENTS

| | | | |
|---|---|---|---|
| 4,319,109 | 3/1982 | Bowles | 219/626 |
| 4,595,814 | 6/1986 | Ogino et al. | 219/626 |
| 4,638,135 | 1/1987 | Aoki | 219/626 |
| 4,686,340 | 8/1987 | Fukasawa | 219/626 |
| 4,810,847 | 3/1989 | Ito | 219/626 |

FOREIGN PATENT DOCUMENTS

| | | |
|---|---|---|
| 0190904 | 8/1986 | European Pat. Off. . |
| 0405611 | 1/1991 | European Pat. Off. . |
| 0517226 | 12/1992 | European Pat. Off. . |
| 2578697 | 9/1986 | France . |
| 3612707 | 10/1986 | Germany . |
| 3-114196 | 5/1991 | Japan ............ 219/626 |
| 4-269488 | 9/1992 | Japan ............ 219/626 |

*Primary Examiner*—Philip H. Leung
*Attorney, Agent, or Firm*—Oblon, Spivak, McClelland, Maier & Neustadt, P.C.

[57] ABSTRACT

This invention relates to a process and a device for controlling power for a circuit comprising a resonant inverter intended to supply a variable impedance load comprising an inductive component. The invention renders the active power consumed by the load independent of the nature of the load by producing an error signal that is a function of an average value of a current passing through power transistors of the inverter, this error signal being used to control a power modulator controlling the switching of the power transistors. Such a process and device finds particular application to a circuit for controlling power supplied to an inducer and a cooking utensil.

17 Claims, 4 Drawing Sheets

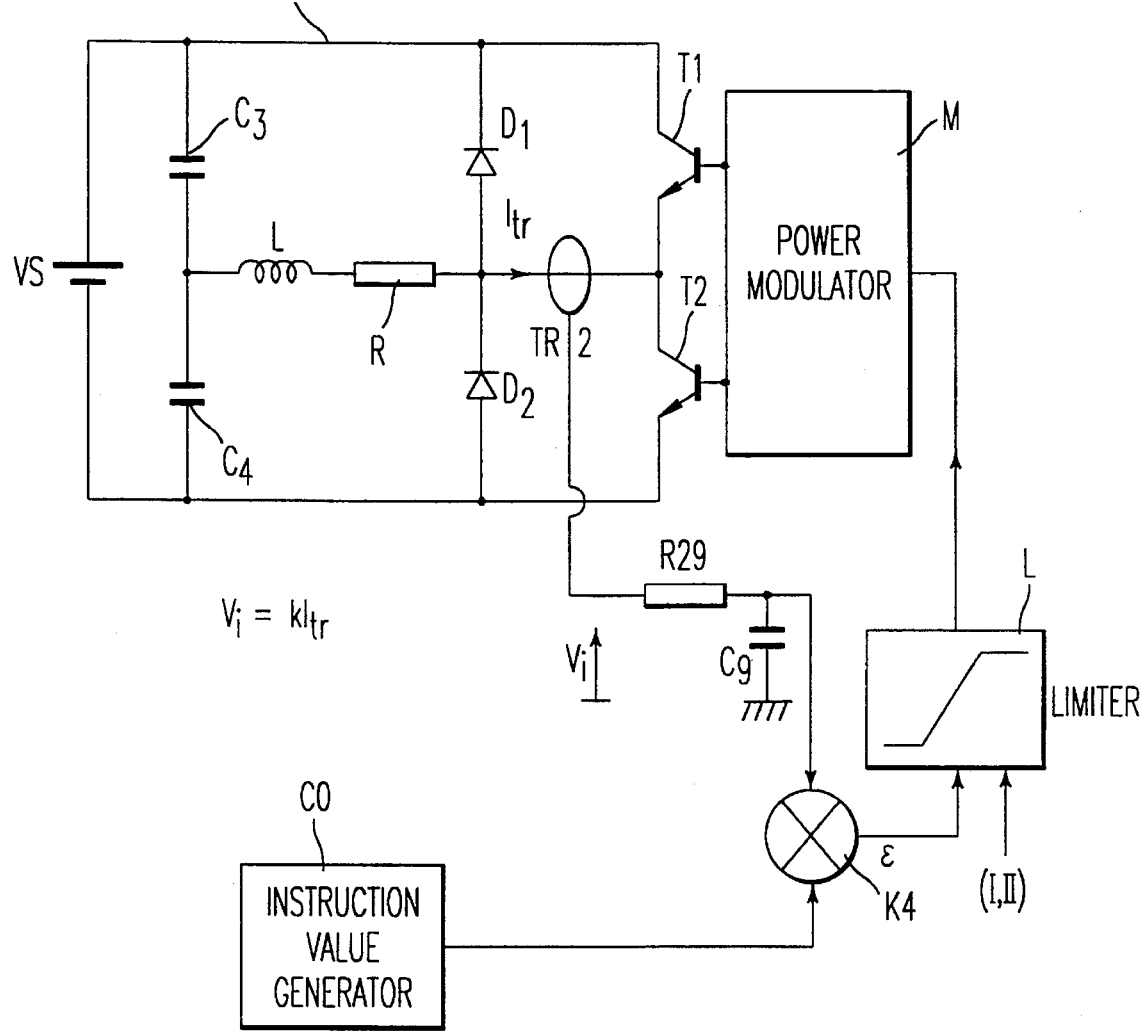

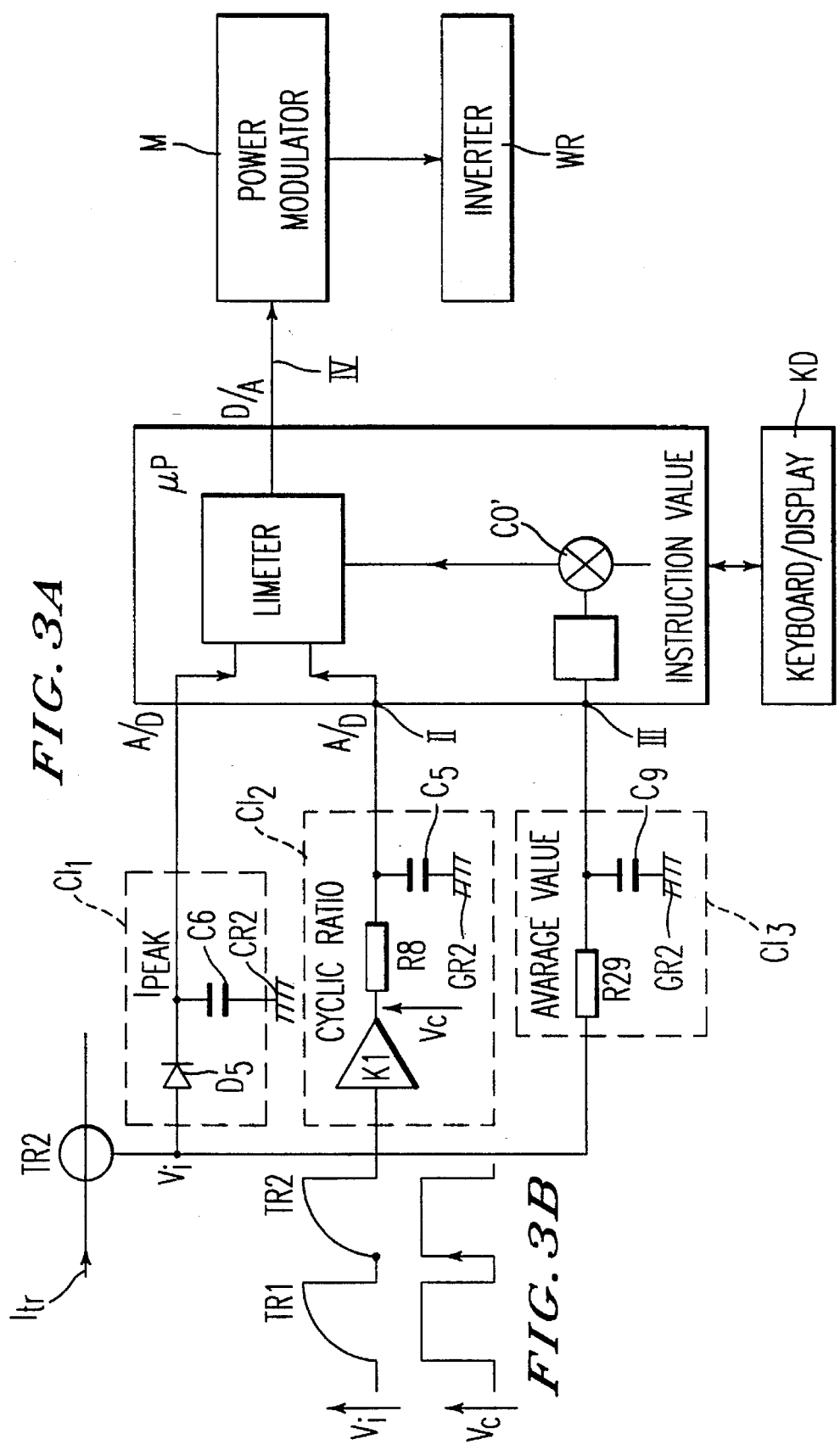

PROCESS AND DEVICE FOR CONTROLLING POWER FOR A CIRCUIT FOR INDUCTION COOKING INCLUDING A RESONANT INVERTOR

BACKGROUND OF THE INVENTION

1. Field of the Invention

The present invention is directed to a process and a device for controlling power for a circuit comprising a resonant inverter.

2. Discussion of the Background

Patent application GB 2 175 154 A discloses an inverter which supplies a variable impedance load and comprises an inductive component and a resistive component. This inverter is of the resonance type and comprises a control circuit in which a first and second DC voltage, which represent respectively a peak value and a cyclic ratio of currents circulating in transistors of the inverter, are applied to the inputs of an amplitude comparator, the output of this comparator serving to control a frequency of a switching pulse of the resonant circuit.

This type of inverter is used, in particular, in induction cooking plates, the load then comprising an inducer and a cooking utensil set on the inducer. In this case, the power control of the inverter is an open loop control as long as the current in the transistors of the inverter itself is not greater than a given value.

With this type of control circuit, it is realized that, when saucepans are made of different materials but with the same diameter, they are going to receive a different power. Furthermore, it is desirable that between two utensils of different diameter, the one whose diameter is smaller consumes less power. It is therefore difficult to regulate properly the power of the induction cooking plates. Actually, during the manufacture, the power for a given saucepan will be regulated with a form factor of the given line voltage but then when other saucepans or another form factor of the line voltage is used, the desired power is not exactly obtained.

SUMMARY OF THE INVENTION

Accordingly, one object of the present invention is to provide a novel process and apparatus for controlling power which, when applied to an induction cooking plate, makes it possible to make an active power consumed by a cooking utensil essentially independent of the nature of the load, namely of the material of the cooking utensil, but such that it remains an increasing function of a diameter of the cooking utensil.

Thus, the present invention has as one of its objects a process and apparatus for controlling power for a circuit comprising a resonant inverter intended to supply a variable impedance load comprising an inducer and a cooking utensil heated by the inducer, the inverter being of the type comprising two switching transistors connected in series so as to conduct alternately under an action of a switching device controlled by a control pulse. Two freewheeling diodes are mounted in parallel with the two switching transistors and have a junction point connected to the junction point of the two transistors. The circuit also comprises a current transformer connected between the two junction points for delivering a signal proportional to a current passing through the transistors, and a control circuit receiving the proportional signal as an input and comprising at least one power modulator delivering a control signal of the control pulse.

The process produces an error signal that is a function of an average value of the signal proportional to the current for controlling the power modulator so as to make the active power consumed by the load essentially independent of the material of the cooking utensil and such that it is an increasing function of a diameter of the cooking utensil.

According to a preferred embodiment, the error signal is obtained by comparing the input signal proportional to the transistor current and integrated with a predetermined power instruction, for example selected by the user.

The process described above, in fact, comprises a control loop that measures only one piece of information, namely the average value of the current passing through the power transistor or power transistors.

This invention also has as one of its object a device for using the process described above, which device comprises means for producing an error signal that is a function of an average value of a signal proportional to a current passing through the two transistors and controlling the power modulator so as to make the active power consumed by the load essentially independent of the material of the cooking utensil and such that it is an increasing function of the diameter of the cooking utensil.

The process and the device described above exhibit a certain number of advantages, the main advantage being the simplicity of use.

Actually, the process requires only one piece of information for its use, namely the knowledge of the transistor current, this piece of information furthermore being already present. In addition, the sensor used for this piece of information, namely the current transformer, already exists in most inverters to perform other functions, particularly the synchronization or the safety of the operation.

On the other hand, the piece of information is referenced to the ground of the control electronics, which prevents the problems of insulation and of ground current.

Therefore, in this way a power control is obtained that is simple to produce and that does not require the use of expensive additional components.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is a simplified electrical diagram of a first embodiment of a control device according to the present invention; and FIGS. 3A and 3B are, respectively, a simplified diagram of a second embodiment of a control device according to the present invention and the voltage-time curves at two points of the circuit of FIG. 3A.

DESCRIPTION OF THE PREFERRED EMBODIMENTS

Figure 1A:
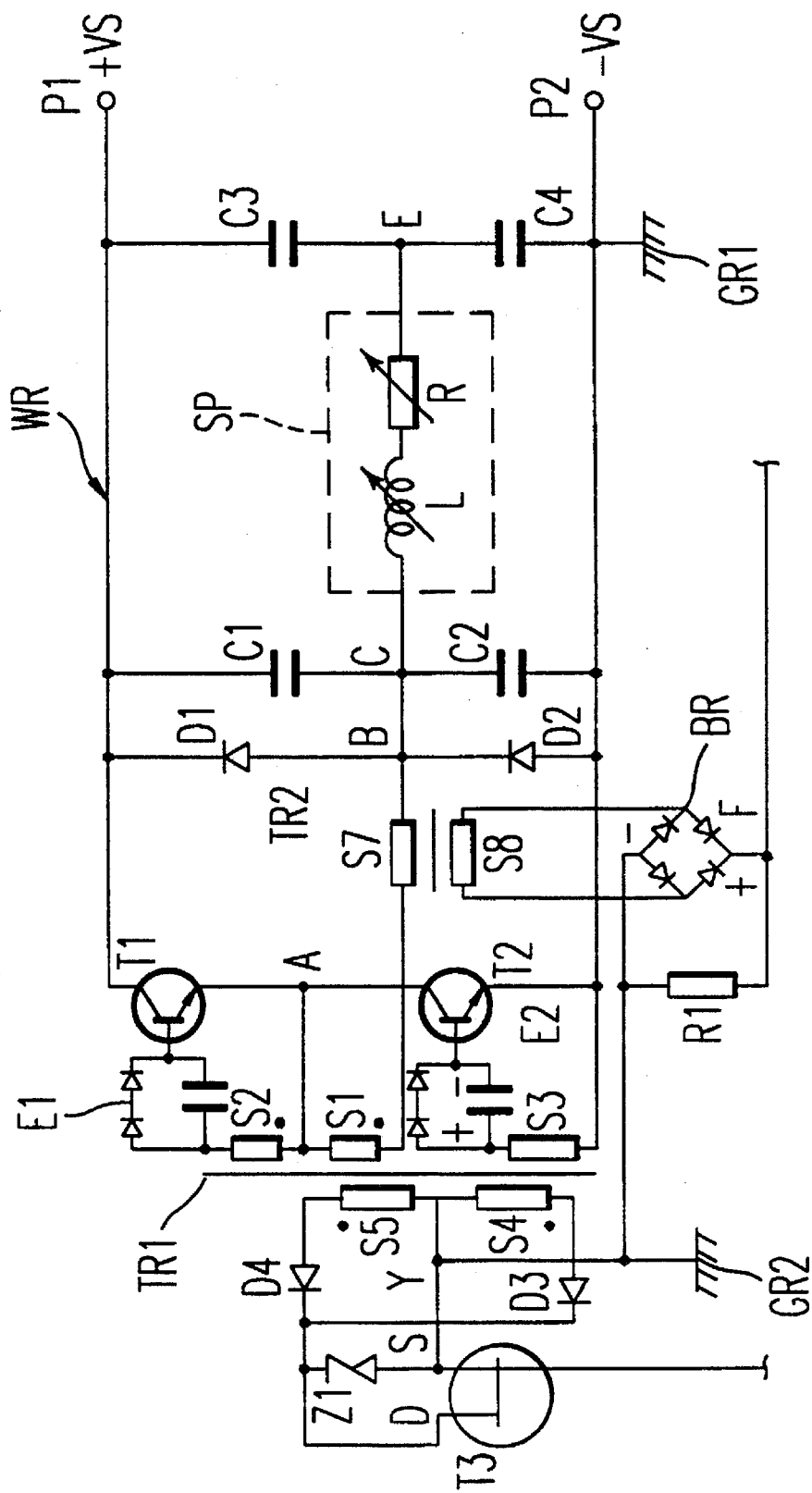
FIG. 1 represents an electric circuit of an inverter for supplying a load having an inductive component with a regulating device according to the present invention.
Figure 1B:
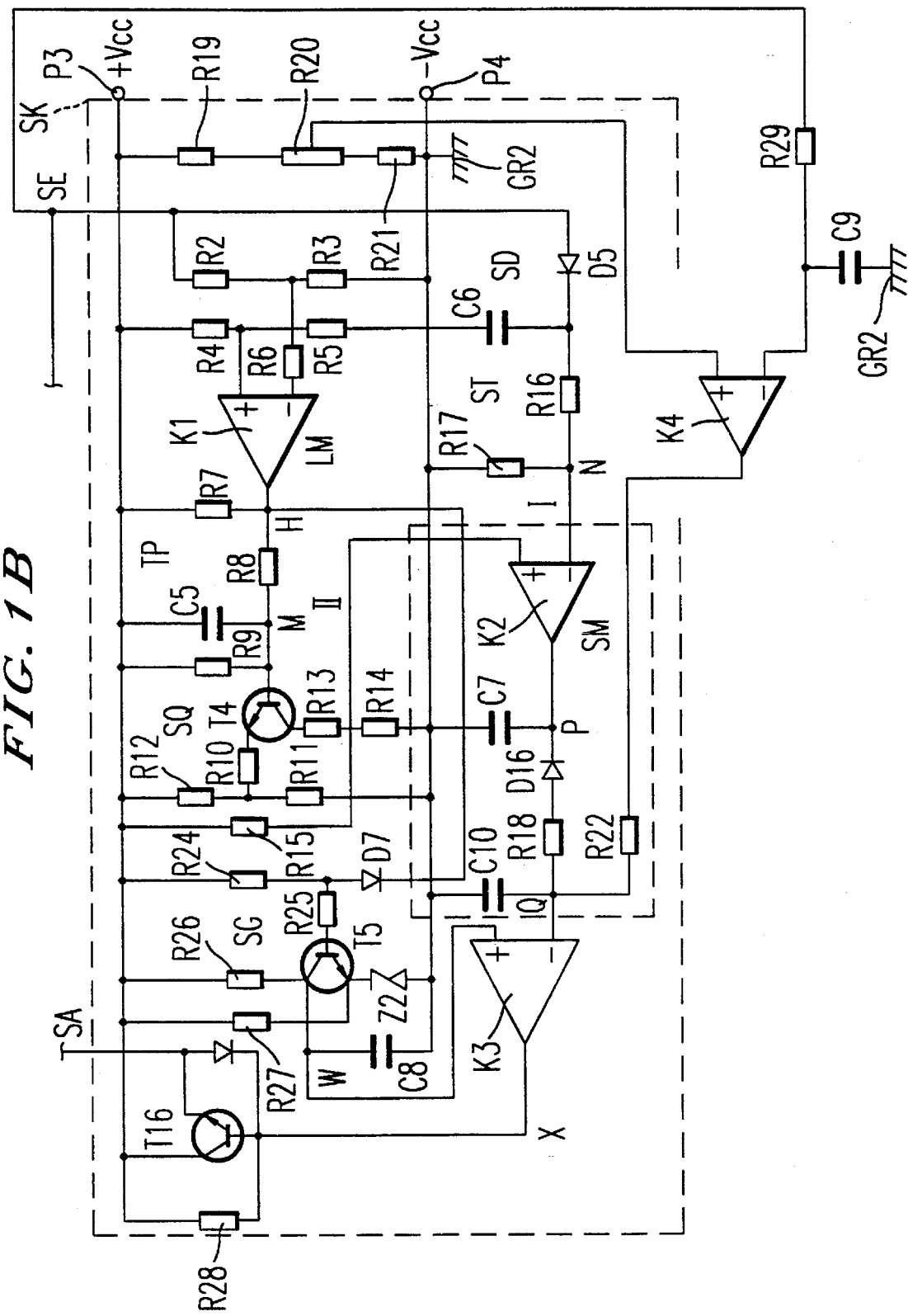

Referring now to the drawings, wherein like reference numerals designate identical or corresponding parts throughout the several views, and more particularly to FIG. 1 thereof, the elements of an inverter for supplying a load having an inductive component is detailed. To obtain more detail on the operation of such an inverter, reference can be made in particular to patent application GB 2 175 154 A, whose contents are incorporated by reference in this patent application, as well as to the other applications cited in this application.

As shown in FIG. 1, the inverter comprises a converter WR which supplies an inductive component load SP, the load SP being symbolized by an inductance L mounted in series with a variable resistance R. The converter WR comprises, mounted in parallel between the two terminals P1 and P2 connected respectively to the DC voltages +VS and −VS, two bipolar power switching transistors T1 and T2 of the NPN-type connected in series, two switching diodes D1 and D2 connected in series and exhibiting a polarity opposite the collector-emitter path of transistors T1 and T2, two switching capacitors C1 and C2 connected in series, and two filtering capacitors C3 and C4 which are connected in series and which form a capacitive voltage divider. On the other hand, terminal P2 is also connected to a first ground GR1.

As shown in FIG. 1, junction point A that is found between the emitter of transistor T1 and the collector of transistor T2 is connected through winding S1 of a first current transformer TR1 and through winding S7 of a second current transformer TR2 to junction points B and C provided respectively between diodes D2 and D1 and capacitors C2 and C1. Load SP is connected between junction points C and E, junction point E being found between filtering capacitors C3 and C4. First current transformer TR1 is used to produce the control currents applied to the bases of the switching transistors T1 and T2 which are activated alternately in relation to time. These power transistors T1 and T2 are controlled so as to be alternately conductive and cut-off according to the "push-pull" method.

As shown in FIG. 1, winding S2 of transformer TR1 is connected between the emitter and a voltage source E1 controlling the base of transistor T1. On the other hand, the third secondary winding S3 of transformer TR1 is connected in series to a second voltage source E2 between the emitter and the base of second power transistor T2. Windings S2 and S3 are polarized so that, when the current passes from the emitter to the load in the case of winding S2 or from the load to the collector in the case of winding S3, the induced current passes into the base of the corresponding transistor. In this way, secondary windings S2 and S3 of transformer TR1 are polarized in a manner opposite one another. Thus, transistors T1 and T2 are activated alternately, namely one transistor is conductive while the other is cut-off.

In the embodiment of FIG. 1, the inverter shown is a resonant inverter. Because of this, the switching of transistors T1 and T2 is performed by using a single active semiconductor switching element such as a bipolar power transistor or MOS field-effect transistor T3 and the two secondary windings S4 and S5 of transformer TR1 wound in opposite directions. Two terminals of these secondary windings are connected to one another and to the source electrode S of transistor T3. Junction point Y between these two windings S4 and S5 and source electrode S of transistor T3 is connected to a ground GR2. The electrical separation of grounds GR1 and GR2 makes it possible to obtain a better protection from overvoltages. The free ends of secondary windings S4, S5 are connected respectively to the anode of a diode D3 and the anode of a diode D4. The cathodes of diodes D3 and D4 are connected to one another and to drain electrode D of transistor T3. The switching of transistor T3 is performed by a positive voltage pulse UG applied to its gate electrode G. This pulse comes from control circuit SK which will be described in a more detailed way below. A zener diode Z1 is connected in parallel between source electrode S of transistor T3 and the point common to the cathodes of diodes D4 and D3. This zener diode Z1 has as its object to limit the positive voltage in the drain-source path.

The two separate secondary windings S4 and S5 which are electrically insulated from converter WR and polarized in opposite directions are used to switch transistors T1 and T2. To understand in a more detailed way the operation of converter WR and of the switching element T3, reference can be made to patent application GB 2 175 154, although the operation of these elements is not essential within the framework of the present invention.

Control circuit SK will now be descried in a more detailed way. As shown in FIG. 1, secondary winding S8 of current transformer TR2 delivers positive or negative output voltages which are proportional to the currents passing successively through transistors T1 and T2. To produce voltages with a single polarity, namely positive voltages, the terminals of secondary winding S8 are connected to the input terminals of a bridge rectifier BR. Secondary winding S8 is electrically insulated from converter WR. On the other hand, the negative output terminal of bridge rectifier BR is connected to ground GR2 while the positive output terminal F is connected to input SE of control circuit SK. A resistor R1 is connected in parallel to the output terminals of bridge rectifier BR. Output terminal F of bridge rectifier BR delivers a voltage UF whose form corresponds to collector currents iC1 and iC2 circulating in transistors T1 and T2. Voltage UF, which is proportional to the currents passing through transistors T1 and T2, is applied at the input of control circuit SK.

As shown in FIG. 1, control circuit SK is connected by terminal P3 to a positive DC voltage +VCC and by terminal P4 to a negative voltage −VCC. Control circuit SK performs "power modulator" and "limiter" functions and comprises a group of circuits that makes it possible to obtain the cyclic ratio at point II and a peak voltage detector circuit making it possible to obtain the peak value at point I. These values are applied to a comparator SM followed by a diode D6-capacitor C7 circuit performing a limiting of the switched current. Control circuit SK also comprises a resistor R26—capacitor C8 circuit performing a time function which defines the conduction period of the transistors and integrates the modulating function.

More specifically, voltage UF is applied on the one hand to the input of an amplifier LM which limits and reverses the amplitude and which comprises a high-gain operational amplifier K1 to perform an analog voltage comparison. On the other hand, voltage UF applied to input SE is applied to a peak detector SD that contains a rectifier diode D5 and a filtering capacitor C6 in parallel with a voltage divider ST comprising resistors R16 and R17 connected in series.

The non-reversing input (+) of amplifier K1 which acts as a voltage comparator is connected to a junction point of an additional voltage divider comprising resistors R4 and R5, connected themselves between terminals P3 and P4, which provides a continuous reference voltage. The reversing input (−) of amplifier K1 is connected to a junction point of the two resistors R2 and R3 whose ends are connected between input terminal SE and ground GR2. Output H of amplifier K1 is connected through a resistor R7 to terminal P3 and delivers a voltage exhibiting a square wave shape. This voltage contains positive pulses during each cut-off of transistors T1 and T2, these pulses being separated from one another by sections at voltage 0. These sections represent the moments during which one of transistors T1 or T2 is conductive.

Output H of amplifier K1 is also connected to a low-pass filter TP comprising resistor R8 and capacitor C5. Output M of the low-pass filter is connected to a base of a transistor T4 of the PNP type which operates as a controlled current source SQ with a threshold value. This threshold value is formed by a voltage divider comprising resistors R12 and R11 mounted between terminals P3 and P4. The junction point between R11 and R12 is connected by an emitter resistor R10 to the emitter of transistor T4 while the collector of transistor T4 is connected through two resistors R13 and R14 mounted in series to negative terminal P4. The base of transistor T4 is also connected through resistor R9 to positive terminal P3. The junction point between resistors R13 and R14 is connected by a resistor R15 to positive terminal P3 and to the non-reversing input (+) of an operational amplifier K2 which acts as a comparison stage with high current amplification. Junction point N of resistors R16 and R17 which form the output of peak detector SD is connected to the reversing input (−) of amplifier K2.

Amplifier K2 receives on the non-reversing input (+) the cyclic ratio and on the reversing input (−) the value of the peak voltage, as is also explained in British patent GB 2 175 154. The output of amplifier K2 is connected through a capacitor C7, which delays the switching of the voltage from a low level to a high level, to terminal P4 which is connected to ground GR2 and, on the other hand, through a diode D6 and a resistor R18 to reversing input (−) Q of an operational amplifier K3 which performs a voltage comparison and delivers a high-gain signal X. Input Q is also connected to terminal P4 by a capacitor C10 that is used to stabilize the control loop. The circuit indicated in broken lines and comprising amplifier K2, capacitors C7 and C10, diode D6 and resistors R18 and R22 plays the role of a circuit limiting the switched current. On the other hand, reversing input (−) Q is connected through resistor R22 to a circuit delivering an error signal that is a function of an average value of the current passing through the power transistors. This circuit will be described in a more detailed way below.

Output H of amplifier K1 is also connected to the cathode of a diode D7 whose anode is connected by a resistor R24 to terminal P3 and whose anode is also connected through a resistor R25 to a base of a transistor T5 of the PNP type. The collector of transistor T5 is connected through a resistor R26 to terminal P3 and through a capacitor C8 to terminal P4. The emitter of transistor T5 is connected to the junction point between a zener diode Z2 and a resistor R27 which is connected to positive terminal P3. The anode of zener diode Z2 is connected to negative voltage terminal P4. Zener diode Z2 is conductive only when transistor T5 is cut-off and connects the emitter of the transistor T5 to zener voltage VZ2. Transistor T5, collector resistor R26 and capacitor C8 form a sawtooth generator SG which is controlled by the output voltage of amplifier K1. Output W of sawtooth generator SG is connected to the non-reversing input (+) of amplifier K3 serving as a comparator.

In this case, during the conduction time of transistors T1 and T2, diode D7 between output H of amplifier K1 and the junction point of resistors R25 and R26 is conductive and thus keeps the base voltage of transistor T3 below the emitter-voltage. Because of this, transistor T5 is cut-off as long as one of the two transistors T1 and T2 is conductive. Capacitor C8 is loaded through resistor R26. In this way, a voltage increasing approximately linearly is obtained at the level of output W during the conduction periods of transistors T1, T2. When the output voltage of amplifier K1 exhibits greater values, diode D7 is blocked.

Transistor T5 becomes conductive and discharges capacitor C8 at a voltage that is in the vicinity of the zener diode Z2. Transistor T5 remains conductive as long as voltage UH remains at its high voltage value, namely approximately VCC. The sawtooth voltage W thus generated is sent to the non-reversing input (+) of amplifier K3. As long as output P of amplifier K2 limiting the peak value of the current does not exceed the value of the low voltage, this means that the switching current in converter WR which also passes through winding S7 does not exceed the maximum value permitted. Reversing input (−) Q of amplifier K3 then receives only the voltage corresponding to the error signal that is used to adjust the frequency. Consequently, output X of amplifier K3 remains at a low voltage value as long as the sawtooth voltage W does not reach the voltage that is used to control the frequency. When this condition is produced, output X goes to a high level and forms the rising edge of a voltage pulse which is supplied to a base of transistor T6.

Transistor T6 is an NPN-type bipolar transistor mounted in common collector. The collector of transistor T6 is connected directly to terminal P3, and the junction point between the base of transistor T6 and output X of the third amplifier K3 is connected through a resistor R28 to terminal P3. The emitter of transistor T6 which forms a buffer stage in the form of a follower emitter, is connected through output terminal SA of control circuit SK to gate terminal G of transistor T3. Output X remains high as long as the sawtooth voltage W is greater than the voltage on input Q of amplifier K3 that is used to adjust the frequency. This means that the pulse at the output of the third amplifier K3 has a falling edge at the time transistor T5 is cut-off.

The device providing the error signal, according to the present invention, comprises an amplifier K4 receiving on its non-reversing input (+) a voltage delivered by potentiometer R20. More specifically, the non-reversing input (+) of amplifier K4 is connected to the sliding contact of potentiometer R20 whose two ends are connected respectively to terminals P3 and P4 by resistors R19 and R21. The voltage delivered by potentiometer R20 is compared to the voltage applied to the reversing input (−) of amplifier K4. This voltage is obtained as follows: voltage UF is applied to input SE and is sent to the reversing input (−) terminal of amplifier K4 by an integrator comprising a resistor R29 and capacitor C9. In this case, the voltage which is proportional to an average value of the transistor current is compared to the reference voltage provided by potentiometer R20 and as an output an error signal is obtained which acts on the frequency. Actually, as previously explained as well in document GB 2 175 154 A, the frequency depends on the comparison made between the sawtooth voltage W applied to the non-reversing input (+) of amplifier K3, and voltage UQ to reversing input Q of this amplifier K3. Now, in the case of the present invention, point Q is brought to the voltage of error signal ∈, optionally modified in case of imitation by amplifier K2.

With reference to FIGS. 2, 3A and 3B, two embodiments of the device making it possible to use the present invention will be described in a more detailed way. In FIG. 2, an analog embodiment has been represented that is approximately identical to the embodiment used in FIG. 1. In FIG. 3A, a digital embodiment for using the present invention has been represented.

The elements of FIG. 2 that are identical to those of FIG. 1 carry the same reference numerals. In this case, the two switching transistors T1 and T2, the two switching diodes D1 and D2, the load formed by inductance L and by resistance R and the two filtering capacitors C3, C4 are found. These elements are mounted as described above and are connected to the terminals of a DC power supply voltage VS. This circuit comprises the essential parts of the converter.

According to the present invention, voltage Vi, obtained by a current transformer TR2 and therefore proportional to transistor current Itr, is sent to an integrator comprising resistor R29 and capacitor C9. The voltage at the terminals of C9 proportional to the average value of the transistor current is applied to the input of a comparator K4 whose other input receives an instruction value from Instruction Value Generator CO. The output of the comparator K4 provides an error value $\epsilon$ which is applied to limiter L which can be performed in the manner described in FIG. 1, the limiter L furthermore receives the data relative to the cyclic ratio and to the peak value of the transistor currents coming from points I and II of FIG. 1. The output of limiter L is sent to a power modulator M which controls the switching of transistors T1 and T2. As explained before, this output is brought to the potential of error signal $\epsilon$ when the limiter L exerts no limitation, and to a diminished potential in case of limitation.

In the embodiment represented in FIG. 3A, the different current values are digitized by analog-digital A/D converters and are processed by a microprocessor µP which performs the comparison function providing error signal $\epsilon$ and the limiter function. As represented in FIG. 3A, current generator Itr is connected by circuits CI1, CI2, CI3 and the A/D converters to inputs I, II, III of microprocessor µP.

Circuit CI1 is a peak detector. It essentially comprises diode D5 mounted in series between generator Itr and the A/D converter connected to input I and capacitor C6 mounted between the cathode of diode D5 and ground GR2. Circuit CI2 provides the cyclic ratio and comprises amplifier K1 which receives voltage $V_i$ on its input as represented in FIG. 3B and delivers a voltage VC as an output as represented in FIG. 3B. A resistor R8 is connected in series between the output of K1 and the A/D converter connected to input II of the microprocessor and a capacitor C5 is connected between the A/D converter connected to input II and ground GR2. Inputs I and II are sent to a module performing the limiter function.

On the other hand, circuit CI3 provides the average value of transistor current Itr and essentially comprises a resistor R29 mounted in series between the secondary of the current transformer and the A/D converter connected to input III of the microprocessor and capacitor C9 connected between the A/D converter and ground GR2.

The microprocessor µP comprises a comparison module CO' which receives an instruction value entered through the keyboard/display K/D and compares it to input III. The error signal d' obtained is sent to the limiter module. The output of the limiter module is sent to the input of a digital-analog D/A converter on output IV. This output IV is connected to the power modulator M itself connected to the inverter WR performed in a standard way.

The system described above makes it possible therefore to produce a control loop measuring only one piece of information, namely the average value of the current passing through the power transistor or power transistors.

This process is particularly suited to plates for cooking by induction. Actually, at a power instruction given by the user, containers of the same diameter consume powers that are identical and stable independently of the nature of their material. However, between two containers of different diameters, the one whose diameter is smaller will consume less power.

On the other hand, the proposed control results in maintaining the power proportional to the line voltage. This control loop makes it possible to eliminate adjusting the power if the measuring circuit and the reference have the desired accuracy.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process of controlling power for a circuit of a resonant inverter for supplying a variable impedance load comprising an inducer and a cooking utensil heated by the inducer, the resonant inverter comprising two switching transistors connected in series and at a first junction point so as to conduct alternately under an action of a switching device controlled by a control pulse, two freewheeling diodes mounted in parallel with the two switching transistors and having a second junction point connected to the first junction point of the two transistors, a current transformer connected between the first and second junction points and delivering a first signal proportional to a current passing through the two transistors, and a control circuit receiving said first signal as an input and comprising at least one power modulator delivering a control signal of the control pulse, the process comprising the steps of:

generating an error signal that is a function of an average value of said first signal proportional to the current passing through the two transistors; and controlling the at least one power modulator so as to make an active power consumed by the variable impedance load essentially independent of a material of the cooking utensil and such that it is an increasing function of a diameter of the cooking utensil.

2. The process of controlling power according to claim 1, wherein the error signal is obtained by comparing an average value of the signal proportional to the current passing through the two transistors to a predetermined power instruction.

3. A control device for controlling power for a circuit of a resonant inverter for supplying a variable impedance load comprising an inducer and a cooking utensil heated by the inducer, the resonant inverter comprising two switching transistors connected in series and at a first junction point so as to conduct alternately under an action of a switching device controlled by a control pulse, two freewheeling diodes mounted in parallel with the switching transistors and having a second junction point connected to the first junction point of the two transistors, a current transformer connected between the first and second junction points and delivering a first signal proportional to a current passing through the two transistors, and a control circuit receiving said first signal as an input and comprising at least one power modulator delivering a control signal of the control pulse, the control device comprising:

means for producing an error signal that is a function of an average value of the first signal proportional to the current passing through the two transistors and controlling the power modulator so as to make an active power consumed by the variable impedance load essentially independent of a material of the cooking utensil and such that it is an increasing function of a diameter of the cooking utensil.

4. The control device according to claim 3, wherein said means for producing the error signal comprises integration means for integrating a signal delivered by the current transformer, means for generating said average value of the first signal proportional to the current passing through the two transistors, and comparison means for comparing the average value with an instruction value to deliver said error signal.

5. The control device according to claim 4, wherein the comparison means comprises a comparator receiving on a first input the instruction value, and on a second input, the average value.

6. The control device according to claim 4, wherein the average value is applied to an input of an analog-to-digital converter connected to an input of a microprocessor for performing the comparison.

7. The control device according to claim 6, wherein the limiter is formed inside the microprocessor.

8. The control device according to claim 3, wherein the error signal is applied to a limiter of the control circuit comprising an amplitude comparison stage for receiving on a first input a first DC voltage representing a peak value controlled by the error signal and for receiving on a second input a second DC voltage representing a cyclic ratio of the current in the two transistors.

9. The control device according to claim 3, wherein the switching device comprises a field-effect transistor.

10. The control device according to claim 3, wherein the current transformer comprises a first winding connected in an output path of the two transistors and a second winding connected to an input of a rectifier whose output voltage of a constant polarity is used to generate a signal at an input of the control circuit.

11. A circuit for supplying a variable impedance load of an inducer and a cooking utensil heated by the inducer, comprising:

two switching transistors connected in series and at a first junction point so as to conduct alternately under action of a switching device controlled by a control pulse;

two freewheeling diodes mounted in parallel with the two switching transistors and having a second junction point connected to the first junction point of the two transistors;

a current transformer connected between the first and second junction points and delivering a first signal proportional to a current passing through the two transistors;

a control circuit receiving said first signal as an input and comprising at least one power modulator for delivering a control signal;

means for producing an error signal that is a function of an average value of the first signal proportional to the current passing through the two transistors and for controlling the at least one power modulator so as to make an active power consumed by the variable impedance load essentially independent of a material of the cooking utensil and such that it is an increasing function of a diameter of the cooking utensil; and wherein the error signal is applied to a limiter of the control circuit comprising an amplitude comparison stage for receiving on a first input a first DC voltage representing a peak value controlled by the error signal and for receiving on a second input a second DC voltage representing a cyclic ratio of current in the two transistors, an output of the limiter being applied to the at least one power modulator for controlling the at least one power modulator.

12. The control device according to claim 11, wherein said means for producing the error signal comprises integration means for integrating the first signal delivered by the current transformer, means for generating said average value of the first signal proportional to the current passing through the two transistors, and comparison means for comparing the average value with an instruction value to deliver said error signal.

13. The control device according to claim 12, wherein the comparison means comprises a comparator receiving on a first input the instruction value, and on a second input, the average value.

14. The control device according to claim 12, wherein the average value is applied to an input of an analog-to-digital converter connected to an input of a microprocessor for performing the comparison.

15. The control device according to claim 14, wherein the limiter is formed inside the microprocessor.

16. The control device according to claim 11, wherein the switching device comprises a field-effect transistor.

17. The control device according to claim 11, wherein the current transformer comprises a first winding connected in an output path of the two transistors and a second winding connected to an input of a rectifier whose output voltage of a constant polarity is used to generate a signal at an input of the control circuit.

* * * * *